(12) United States Patent
Kanamaru et al.

(10) Patent No.: US 10,843,518 B2
(45) Date of Patent: Nov. 24, 2020

(54) VEHICLE AND SUSPENSION ARM

(71) Applicant: MAZDA MOTOR CORPORATION, Hiroshima (JP)

(72) Inventors: Daisuke Kanamaru, Hatsukaichi (JP); Hiroto Kido, Aki-gun (JP); Yasushi Ishikawa, Hiroshima (JP); Atsushi Kawamoto, Hiroshima (JP); Yuuki Uchiba, Hiroshima (JP); Hiroki Kimura, Hiroshima (JP); Susumu Sano, Kure (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 227 days.

(21) Appl. No.: 16/116,404

(22) Filed: Aug. 29, 2018

(65) Prior Publication Data

US 2019/0077207 A1 Mar. 14, 2019

(30) Foreign Application Priority Data

Sep. 14, 2017 (JP) .................................. 2017-176468

(51) Int. Cl.
*B60G 7/00* (2006.01)
*B62D 21/15* (2006.01)

(52) U.S. Cl.
CPC ........... *B60G 7/001* (2013.01); *B62D 21/152* (2013.01); *B60G 2206/016* (2013.01); *B60G 2206/122* (2013.01); *B60G 2206/8102* (2013.01); *B60G 2206/8201* (2013.01)

(58) Field of Classification Search
CPC .............. B60G 7/001; B60G 2206/016; B60G 2206/122; B62D 21/152
See application file for complete search history.

(56) References Cited

U.S. PATENT DOCUMENTS

| 5,845,938 | A  | * | 12/1998 | Kato ...................... | B60G 7/001 |
|           |    |   |         |                            | 280/784    |
| 9,623,712 | B2 | * | 4/2017  | Sakaguchi ............. | B60G 7/001 |
| 9,789,743 | B2 | * | 10/2017 | Donkai ................... | B60G 3/06  |

FOREIGN PATENT DOCUMENTS

| JP | 05116647     | A | * | 5/1993  |
| JP | 2000071734   | A | * | 3/2000  |
| JP | 2003-300405  | A |   | 10/2003 |
| JP | 2012-158200  | A |   | 8/2012  |
| JP | 2015-157539  | A |   | 9/2015  |
| JP | 2016-153269  | A |   | 8/2016  |

* cited by examiner

*Primary Examiner* — Faye M Fleming
(74) *Attorney, Agent, or Firm* — Studebaker & Brackett PC

(57) ABSTRACT

A fragile portion is provided at a portion of a suspension arm which is positioned near a vehicle-body attachment portion. The fragile portion is configured such that when a load which is greater than a specified magnitude is inputted to a front wheel from a vehicle forward side, the suspension arm is bent at the fragile portion, whereby the front wheel is rotated rearwardly around the fragile portion.

6 Claims, 6 Drawing Sheets

VEHICLE AND SUSPENSION ARM

BACKGROUND OF THE INVENTION

The present invention relates to a vehicle comprising a suspension arm which is provided with a front-wheel support portion supporting a front wheel of the vehicle at one end thereof and a vehicle-body attachment portion attached to a vehicle-body member of the vehicle at the other end thereof, the vehicle-body attachment portion being positioned on an inward side, in a vehicle width direction, of the front-wheel support portion, and the suspension arm itself.

Conventionally, a vehicle frontal collision in which the vehicle collides with an obstacle at a position of the vehicle which is located on an outward side, in the vehicle width direction, of a front side frame is called a small overlap collision. In this small overlap collision, there is a case where the front wheel retreats and then hits against a vehicle body which is positioned in back of the front wheel. In this case, a collision load generated in this collision is possibly applied to a cabin of the vehicle.

Herein, Japanese Patent Laid-Open Publication No. 2015-157539, for example, discloses a structure for reducing the above-described collision load applied to the cabin as much as possible, which is configured such that when the collision load is inputted to the front wheel from a vehicle forward side in the small overlap collision, the suspension arm is rotated rearwardly (outwardly) around the above-described vehicle-body attachment portion by the collision load, whereby the front wheel is displaced outwardly in the vehicle width direction.

According to the structure of the above-described patent document, however, in designing the above-described vehicle-body attachment portion which is sensitive to the support performance of the suspension arm (the damping performance of the suspension device accordingly) in a normal traveling state of the vehicle, it is necessary to consider the above-described rotation of the suspension arm in the small overlap collision in addition to the support performance (the damping performance). Herein, it is actually difficult to design the vehicle-body attachment portion, considering these two. That is, the attachment rigidity of the vehicle-body attachment portion being attached to the vehicle-body member needs to be properly low in order to make the suspension arm be rotated around the vehicle-body attachment portion in the small overlap collision. Meanwhile, in the normal traveling state of the vehicle, a large load like the collision load is not applied to the front wheel, but a stress tends to concentrate on the vehicle-body attachment portion. Accordingly, in a case where the suspension devise is designed such that the suspension arm is easily rotated around the vehicle-body attachment portion, there is a problem that the support performance of the suspension arm in the normal traveling state of the vehicle may be deteriorated in a long term use.

SUMMARY OF THE INVENTION

The present invention has been devised in view of the above-described matter, and an object of the present invention is to provide a vehicle and a suspension arm, which can reduce the collision load applied to the cabin by way of the front wheel as much as possible in the small overlap collision of the vehicle, without deteriorating the support performance of the suspension arm in the normal traveling state of the vehicle.

The present invention is a vehicle comprising a cabin, a front wheel supported at a side portion of the vehicle which is positioned in front of the cabin, a suspension arm provided with a front-wheel support portion supporting the front wheel of the vehicle at one end thereof and a vehicle-body attachment portion attached to a vehicle-body member of the vehicle at the other end thereof, the vehicle-body attachment portion being positioned on an inward side, in a vehicle width direction, of the front-wheel support portion, and a fragile portion provided at a portion of the suspension arm which is positioned near the vehicle-body attachment portion, wherein the fragile portion is configured such that when a load which is greater than a specified magnitude is inputted to the front wheel from a vehicle forward side, the suspension arm is bent at the fragile portion, whereby the front wheel is rotated rearwardly around the fragile portion of the suspension arm.

According to the present invention, when the load which is greater than the specified magnitude (i.e., the collision load) is inputted to the front wheel from the vehicle forward side in the small overlap collision, the suspension arm is bent at the fragile portion, whereby the front wheel is rotated rearwardly around the fragile portion of the suspension arm. Herein, since the fragile portion is provided at the portion of the suspension arm which is positioned near the vehicle-body attachment portion, a rotational radius of the front wheel can be large similarly to a case where the suspension arm (front wheel) is rotated around the vehicle-body attachment portion like the conventional example. Consequently, the front wheel can be displaced outwardly, in the vehicle width direction, relative to the cabin as much as possible, so that the collision load applied to the cabin by way of the front wheel can be reduced as much as possible. Meanwhile, differently from the case where the suspension arm is rotated around the vehicle-body attachment portion, it is unnecessary to consider the rotation of the suspension arm in the small overlap collision in designing the vehicle-body attachment portion. Accordingly, the support performance of the suspension arm is not deteriorated in the normal traveling state of the vehicle.

In an embodiment of the present invention, a curve portion is provided at a middle portion, in a longitudinal direction, of the suspension arm, the curve portion being configured such that the suspension arm curves rearwardly from the front-wheel support portion toward the vehicle-body attachment portion, and the fragile portion is positioned on a side of the vehicle-body attachment portion relative to a maximum curvature portion of the curve portion where curvature of the curve portion is the maximum.

Herein, if the fragile portion is not provided, the suspension arm is generally bent at the maximum curvature portion when the collision load is applied to the front wheel from the vehicle forward side in the small overlap collision. In this case where the suspension arm is bent at the maximum curvature portion, since the maximum curvature portion is generally provided at a portion of the suspension arm which is located on a side of the front-wheel support portion relative to a portion where the fragile portion is provided, the front wheel tends to be easily displaced inwardly in the vehicle width direction (toward the cabin). According to this embodiment, since the fragile portion is positioned on the side of the vehicle-body attachment portion relative to the maximum curvature portion in the longitudinal direction of the suspension arm which is provided with the curve portion as described above, the suspension arm can be made to be bent at the fragile portion when the collision load is applied to the front wheel from the vehicle forward side. Accordingly, the collision load applied to the cabin by way of the front wheel can be reduced as much as possible.

In another embodiment of the present invention, a reinforcing member is provided at a portion of the suspension arm which includes at least the maximum curvature portion, excluding the fragile portion, such that the reinforcing member extends in the longitudinal direction of the suspension arm.

According to this embodiment, when the collision load is inputted to the front wheel from the vehicle forward side, bending of the suspension arm around the fragile portion can be promoted further more.

In another embodiment of the present invention, the suspension arm comprises a bottom wall portion extending in the longitudinal direction of the suspension arm and a pair of side wall portions extending upwardly from both ends, in the vehicle width direction, of the bottom wall portion such that the suspension arm has a roughly U-shaped cross section, and a recess portion which is recessed downwardly is formed at an upper face of one of the side wall portions which is located on a bending inward side of the suspension arm in a state where the suspension arm is bent at the fragile portion.

According to this embodiment, the fragile portion can be constituted with a simple structure.

Further, another aspect of the present invention is a suspension arm which is provided with a front-wheel support portion supporting a front wheel of a vehicle at one end thereof and a vehicle-body attachment portion attached to a vehicle-body member of the vehicle at the other end thereof, the vehicle-body attachment portion being positioned on an inward side, in a vehicle width direction, of the front-wheel support portion, wherein a fragile portion is provided at a portion of the suspension arm which is positioned near the vehicle-body attachment portion, and the fragile portion is configured such that when a load which is greater than a specified magnitude is inputted to the front wheel from a vehicle forward side in a state where the suspension arm is attached to the vehicle-body member of the vehicle, the suspension arm is bent at the fragile portion, whereby the front wheel is rotated rearwardly around the fragile portion of the suspension arm.

According to this aspect of the present invention, similar operations/effects to those of the invention described above can be obtained as well.

Other features, aspects, and advantages of the present invention will become apparent from the following description which refers to the accompanying drawings.

DETAILED DESCRIPTION OF THE INVENTION

Figure 1:
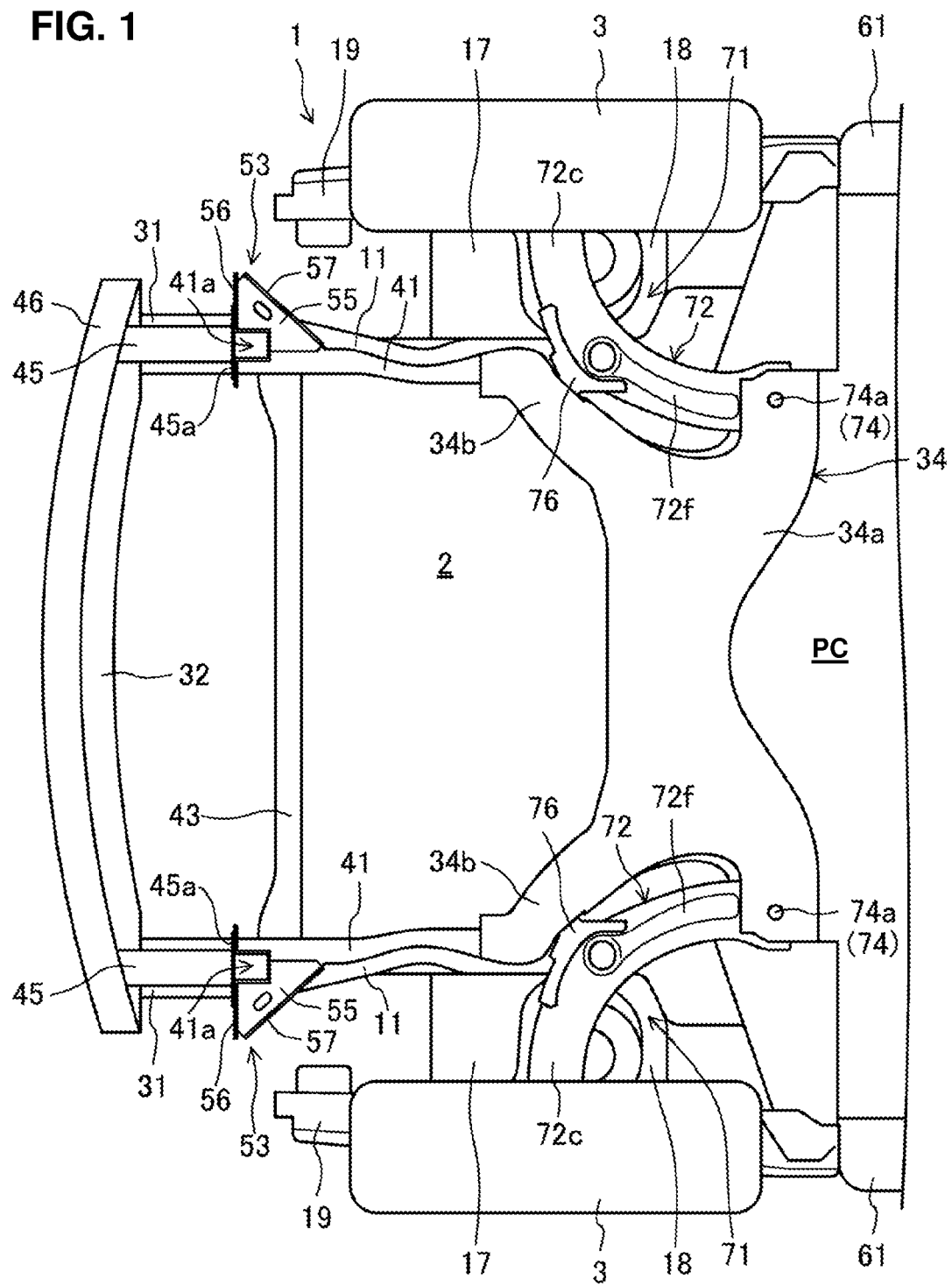
FIG. 1 is a bottom view showing a major part of a front portion of a vehicle where a suspension device for a vehicle according to an embodiment of the present invention is installed.

Hereafter, an embodiment of the present invention will be described specifically referring to the drawings.

FIG. 1 shows a major part of a front portion of a vehicle 1 where a suspension device 71 for the vehicle according to the embodiment of the present invention is installed. An engine room 2 where a powertrain, not illustrated, which drives right-and-left front wheels 3 of the vehicle 1 are arranged is provided at the front portion of the vehicle 1. The powertrain comprises an engine and a transmission to which a torque (power) generated by the engine is inputted. The engine and the transmission are aligned in a vehicle width direction between a pair of right-and-left front side frames 11 which will be described later. A cabin PC is formed behind the engine room 2 where passengers are seated. Hereafter, respective forward (front), rearward (rear), leftward (left), rightward (right), upward (up), and downward (down) sides of the vehicle 1 will be referred to simply as forward (front), rearward (rear), leftward (left), rightward (right), upward (up), and downward (down) sides, without using a term of "vehicle."

The pair of right-and-left front side frames 11 extending in a longitudinal direction are provided at both-side end portions, in the vehicle width direction, of the engine room 2. A crash can 31 is provided at a front end face of each of the right-and-left front side frames 11, and respective front end faces of the right-and-left crash cans 31 are fixed to right-and-left both end portions of a bumper beam 32 which extends in the vehicle width direction.

A wheelhouse panel 17 and a suspension tower 18 are provided on the outward side, in the vehicle width direction, of each of the right-and-left front side frames 11. The wheelhouse panel 17 is configured in an arc shape such that it covers over the front wheel 3, thereby constitutes a front wheelhouse inside this arc shape. A lower end portion of each of the right-and-left suspension towers 18 is fixed to each of the front side frames 1, and an upper end portion of each of the right-and-left suspension towers 18 is fixed to each of right-and-left apron reinforcement members 19.

The right-and-left front side frames 11 are interconnected by a suspension cross member 34 which extends in the vehicle width direction below the front side frames 11. The suspension cross member 34 comprises a body portion 34a which extends in the vehicle width direction and a pair of right-and-left forward extension portions 34b which extend obliquely forwardly and outwardly, in the vehicle width direction, from respective front edges of right-and-left both end portions of the body portion 34a.

An upward extension portion (not illustrated) which extends upwardly is provided at an upper face of each of the right-and-left forward extension portion 34b, and an upper end portion of this upward extension portion is fixed to a lower face of each of the right-and-left front side frames 11.

An extension frame 41 which extends in the longitudinal direction below the front side frame 11 is connected to a front end portion of each of the right-and-left forward extension portions 34b. The right-and-left extension frames 41 are positioned substantially at the same position, in the vehicle width direction, as the right-and-left front side frames 11.

At a front end face of the extension frame 41 is provided a crash can 45 similarly to the crash can provided at the front end of the front side frame 11. Respective front end faces of the right-and-left crash cans 45 are fixed to right-and-left both end portions of a stiffener 46 which extends in the vehicle width direction below the bumper beam 32. This stiffener 46 serves as a leg sweeping member which is configured to contact a lower part of a leg portion of a pedestrian which hits against a front face of the vehicle 1 and sweep the leg portion. Thereby, the pedestrian is made to fall down onto a bonnet (engine hood) of the vehicle 1, whereby the pedestrian can be suppressed from having some damage, such as a broken leg. Herein, respective forward-side parts of the bumper beam 32 and the stiffener 46 are covered with a front bumper, not illustrated. This front bumper is configured to extend outwardly in the vehicle width direction beyond the bumper beam 32 and the stiffener 46.

A recess portion 41a which is recessed rearwardly is formed at the front end face of each of the extension frames 41 over an entire area in the vertical direction. This recess portion 41a is made for lightweight of the extension frame 41.

Respective front end portions of the right-and-left extension frames 41 are interconnected by a connecting member 43 which extends in the vehicle width direction. The body portion 34a and the right-and-left forward extension portions 34b of the suspension cross member 34, the right-and-left extension frames 41, and the connecting member 43 constitute a perimeter frame which is of a roughly rectangular shape in the plan view.

A lower end face of a connecting member, not illustrated, which extends in the vertical direction is fixed to an upper face of the front end portion of each of the extension frames 41, and an upper end face of this connecting member is fixed to a lower face of the front side frame 11.

A load-reception portion 53 is provided at the front end portion of each of the extension frames 41. This load-reception portion 53 is configured to protrude outwardly in the vehicle width direction from the front end portion of the extension frame 41 and receive a collision load in the frontal collision of the vehicle 1 at a position located on the outward side, in the vehicle width direction, of the extension frame 41 (i.e., on the outward side, in the vehicle width direction, of the front side frame 11). That is, when an obstacle 91 (see FIGS. 6 and 7) collides with a part of a front face of the vehicle 1 (the front bumper, in particular) which is positioned on the outward side, in the vehicle width direction, of the extension frame 41, i.e., in the small overlap collision, the collision load is inputted to the load-reception portion 53 by way of the front bumper.

The load-reception portion 53 of the extension frame 41 comprises an upper face member (not shown in FIG. 1) which is made of a plate member and joined to an upper face of the front end portion of the extension frame 41 and a lower face member 55 which is made of a plate member and joined to a lower face of the front end portion of the extension frame 41 such that it faces the upper face member. The upper face member and the lower face member 55 are respectively of a roughly rectangular shape, in the plan view, having the same size, and each of these members comprises a front-side edge which extends outwardly straightly from a portion of the upper face of the extension frame 41 which is positioned on the outward side, in the vehicle width direction, of the recess portion 41a and a rear-side edge which extends obliquely rearwardly and inwardly from a tip of the front-side edge. The respective front-side edges of the upper face member and the lower face member 55 are connected by a front face member 56 which is made of a plate member, and the respective rear-side edges of these members are connected by a rear face member 57 which is made of a plate member. The front face member 56 extends, along a side face and a bottom face of the recess portion 41a, up to a position located inwardly, in the vehicle width direction, relative to the recess portion 41a, and is connected to a flange plate 45a which is provided at a rear face of the crash can 45.

Figure 3:
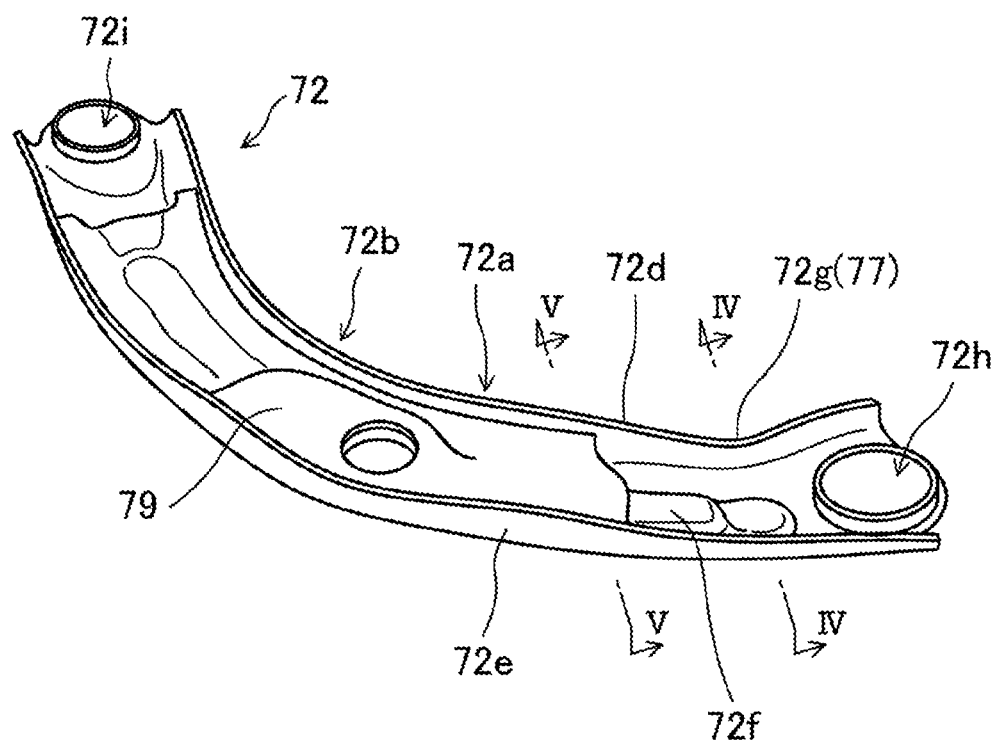
FIG. 3 is a perspective view showing the right-side suspension arm, when viewed from an obliquely upward side.
Figure 4:
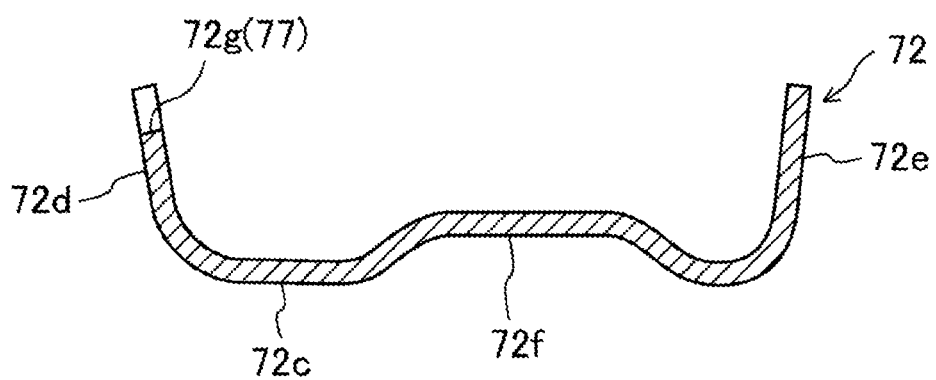
FIG. 4 is a sectional view taken along line IV-IV of FIG. 3.

The suspension device 71 is provided at each side of the right-and-left sides of the vehicle 1, corresponding to each of the right-and-left front wheels 3. The suspension device 71 comprises a suspension arm 72 (lower arm) which supports the front wheel 3 as shown in FIG. 3. Further, the suspension device 71 further comprises a coil spring, a shock absorber, and others (not illustrated) which are housed in the suspension tower 18.

The suspension arm 72 is provided with a front-wheel support portion 73 which supports the front wheel 3 at its one end portion (an outward end portion, in the vehicle width direction, of the suspension arm 72). At the other end portion (an inward end portion in the vehicle width direction) of the suspension arm 72 is provided a first vehicle-body attachment portion 74 which is attached to a vehicle-body member (the suspension cross member 34 (specifically, the body portion 34a) in the present embodiment) of the vehicle 1 and positioned on the inward side, in the vehicle width direction, of the front-wheel support portion 73.

The suspension arm 72 is configured to extend having substantially a constant width, excluding its end portion which is positioned on the side of the first vehicle-body attachment portion 74. At a middle portion, in a longitudinal direction, of the suspension arm 72 is provided a curve portion 72a which is configured such that the suspension arm 72 curves rearwardly from the front-wheel support portion 73 toward the first vehicle-body attachment portion 74. A maximum curvature portion 72b where curvature of the curve portion 72a (in the preset embodiment, curvature of an imaginary line of a center, in a width direction, of the suspension arm 72) is the maximum (a curvature radius the minimum) is provided at a middle portion, in the longitudinal direction of the suspension arm 72, of the curve portion 72a (in the present embodiment, at a position which is located on the side of the front-wheel support portion 73 from a center, in the longitudinal direction of the suspension arm 72, of the curve portion 72a).

A second vehicle-body attachment portion 75 which is attached to a vehicle-body member of the vehicle 1 (in the present embodiment, the suspension cross member 34 (specifically, the forward extension portion 34b) is provided at an out-side part, in a curve direction, of the curve portion 72a via a bracket 76.

The first vehicle-body attachment portion 74 of the suspension arm 72 comprises a support axis 74a which is attached to a left-side or right-side end part of the body portion 34a and extends in the vertical direction, a tubal member 74b which is fixed to an inner peripheral face of a penetration hole 72h of the suspension arm 72, and a rubber bush 74c which connects the support axis 74a and the tubal member 74b.

The second vehicle-body attachment portion 75 of the suspension arm 72 comprises a bolt-shaped support axis 75a which is attached to a left-side or right-side forward extension portion 34b and extends substantially in the longitudinal direction, a tubal member 75b which is fixed to the suspension arm 3 via the bracket 76, and a rubber bush (not illustrated) which connects the support axis 75a and the tubal member 75b.

The front-wheel support portion 73 of the suspension arm 72 comprises a connecting axis 73a which is connected to a hub carrier (knuckle), not illustrated, which supports the front wheel 3. This connecting axis 73a is fixed to an inner peripheral face of a penetration hole 72i of the suspension arm 72.

The suspension arm 72 is made of a plate member and comprises a bottom wall portion 72c which extends in the longitudinal direction of the suspension arm 72 and a pair of side wall portions 72d, 72e which extend upwardly from both ends, in a width direction, of the bottom wall portion 72c such that the suspension arm 72 has a roughly U-shaped cross section. The side wall portion 72d is the one which is positioned on the inside (inward side) of the curve of the side wall portion 72a, and the side wall portion 72e is the one which is positioned on the outside (outward side) of the curve of the side wall portion 72a.

A bead 72f which protrudes upwardly and extends in the longitudinal direction of the suspension arm 72 is provided at a portion of the bottom wall portion 72c over a range from the vicinity of the maximum curvature portion 72b to the vicinity of the first vehicle-body attachment portion 74. The amount of protrusion of an end portion of the bead 72f which is positioned on the side of the first vehicle-body attachment portion 74 is smaller than that of the other part. The end portion of the bead 72f which is positioned on the side of the first vehicle-body attachment portion 74 is located substantially at the same position, in the longitudinal direction of the suspension arm 72, as a recess portion 72g, which will be described later.

A fragile portion 77 is provided at a portion of the suspension arm 72 which is positioned near the first vehicle-body attachment portion 74 (which corresponds to an end portion of the bead 72f which is positioned on the side of the first vehicle-body attachment portion 74). This fragile portion 77 is configured such that when a load which is greater than a specified magnitude is inputted to the front wheel 3 from the vehicle forward side, the suspension arm 72 is bent at the fragile portion 77, whereby the front wheel 3 is rotated rearwardly around the fragile portion 77.

The fragile portion 77 of the suspension arm 72 is provided at the portion, in the longitudinal direction, of the suspension arm 72 which is positioned near the first vehicle-body attachment portion 74 and on the side of the first vehicle-body attachment portion 74 relative to the maximum curvature portion 72b. While the fragile portion 77 of the suspension arm 72 of the present embodiment is not positioned at the curve portion 72a, this fragile portion 77 may be positioned at the curve portion 72a in a case where an end of the curve portion 72a which is positioned on the side of the first vehicle-body attachment portion 74 is positioned near the first vehicle-body attachment portion 74.

In the present embodiment, the fragile portion 77 of the suspension arm 72 is constituted by a recess portion 72g (see FIG. 3 in particular) which is recessed downwardly and formed at an upper face of one of the side wall portions 72d which is located on a bending inward side of the suspension arm 72 (on a curve inward side of the curve portion 72a) in a state where the suspension arm 72 is bent at the fragile portion 77.

The above-described specified magnitude is the minimum of the load in a case where the front wheel retreats and then hits against a vehicle body which is positioned in back of the front wheel 3 in the small overlap collision.

Figure 2:
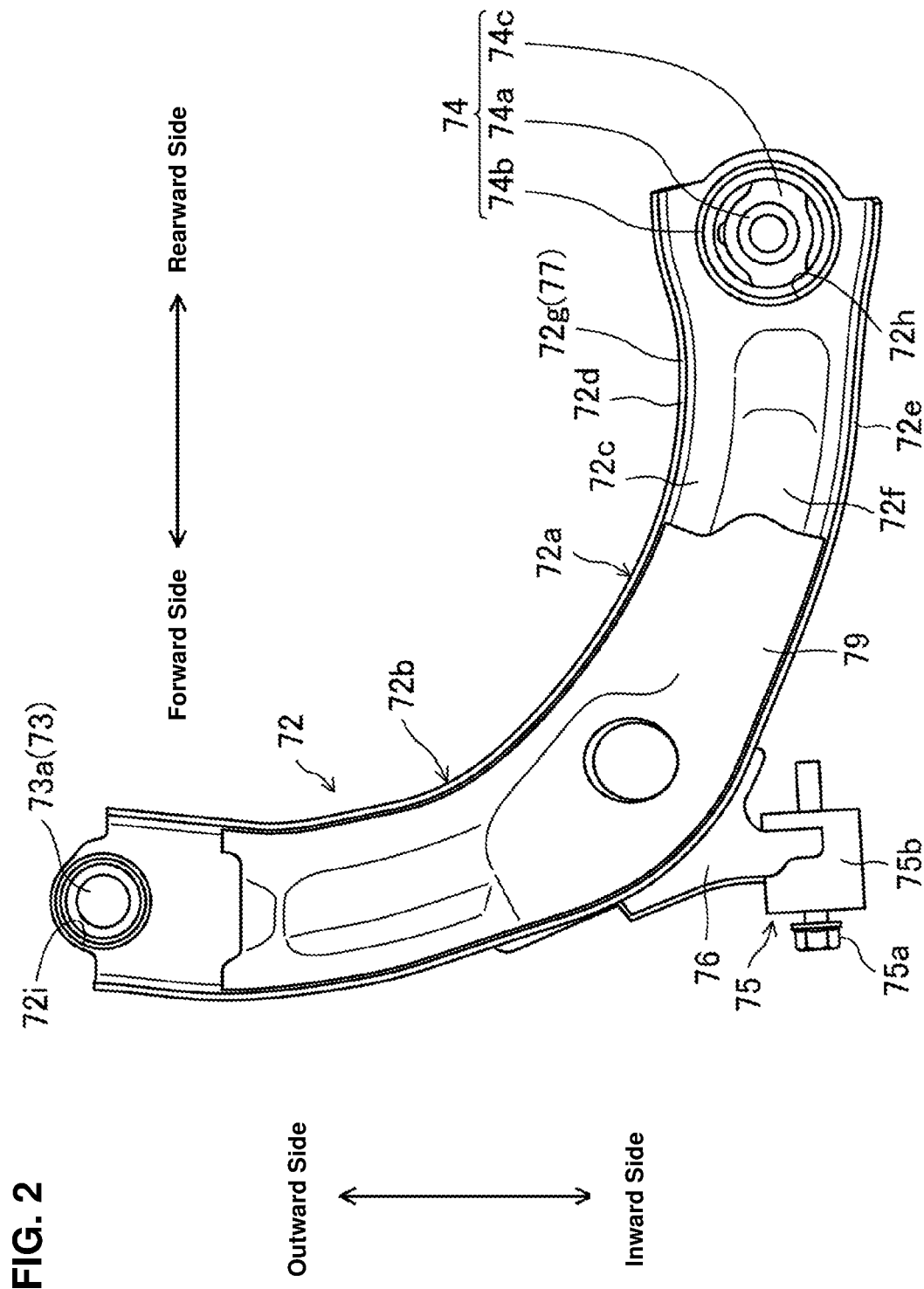
FIG. 2 is a plan view showing a right-side suspension arm.
Figure 5:
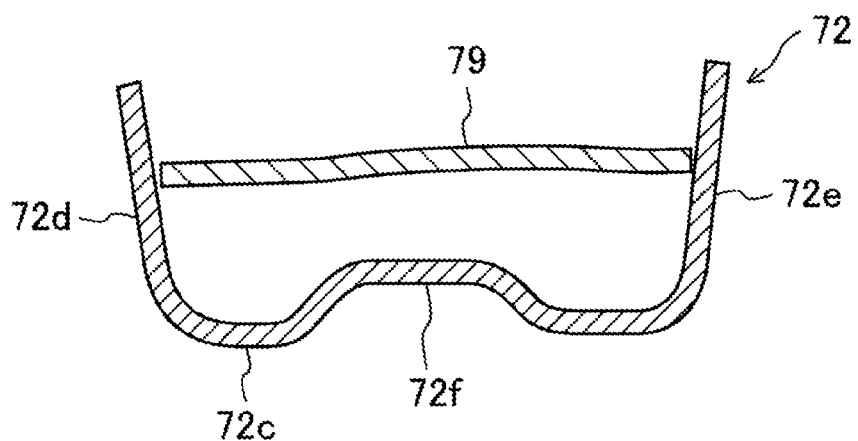
FIG. 5 is a sectional view taken along line V-V of FIG. 3.

As shown in FIGS. 2, 3 and 5, a plate-shaped reinforcing member 79 is provided at a portion of the suspension arm 72 which includes at least the maximum curvature portion 72b, excluding the fragile portion 77, such that the reinforcing member 72 extends in the longitudinal direction of the suspension arm 72. In the present embodiment, the reinforcing member 79 is provided at a portion, in the longitudinal direction, of the suspension arm 72 which is located over a range from a position between the fragile portion 77 and the maximum curvature portion 72b to the vicinity of the front-wheel support portion 73. The reinforcing member 79 is fixed to the side wall portions 72d, 72e of the suspension arm 72 by welding.

It is preferable that a distance, in the longitudinal direction of the suspension arm 72, between the end of the reinforcing member 72 which is positioned on the side of the first vehicle-body attachment portion 74 and the fragile portion 77 be longer than a first specified distance. This is because if the above-described distance is the above-described first specified distance or shorter, the suspension arm 72 may not be bent easily at the fragile portion 77 when the load which is greater than the specified magnitude is inputted to the front wheel 3 from the vehicle forward side.

Herein, when the vehicle 1 has the small overlap collision with the obstacle 91 at the right-side part of its front face (see FIGS. 6 and 7), the collision load is inputted to the load-reception portion 53 of the right-side extension frame 41 from the vehicle forward side by way of the front bumper. Accordingly, a pressing force is applied to the right-side extension frame 41 so as to press it inwardly in the vehicle width direction. The right-side extension frame 41 is bent inwardly in the vehicle width direction by this pressing force.

Figure 6:
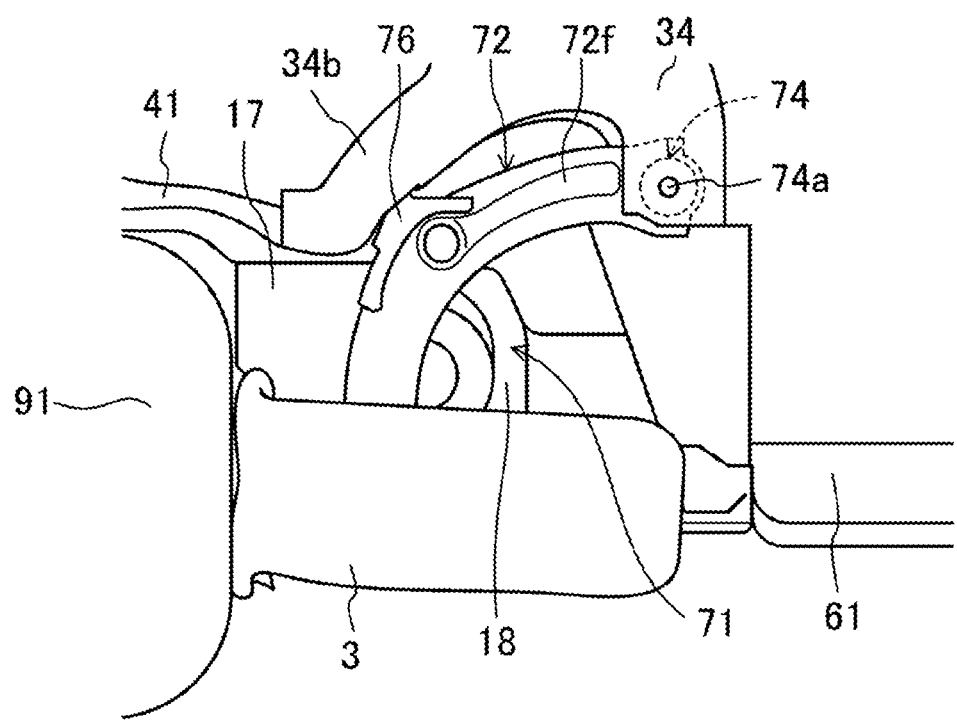
FIG. 6 is a bottom view schematically showing the right-side suspension arm in a state before its deformation when a collision load is inputted to a right-side front wheel in a case where the vehicle collides with an obstacle at a right-side part of its front face in a small overlap collision.

When the obstacle 9 further retreats relative to the vehicle 1, it hits against the right-side front wheel 3 as shown in FIG. 6, whereby the load which is greater than the specified magnitude (the collision load) is inputted to the front wheel 3 from the vehicle forward side.

Figure 7:
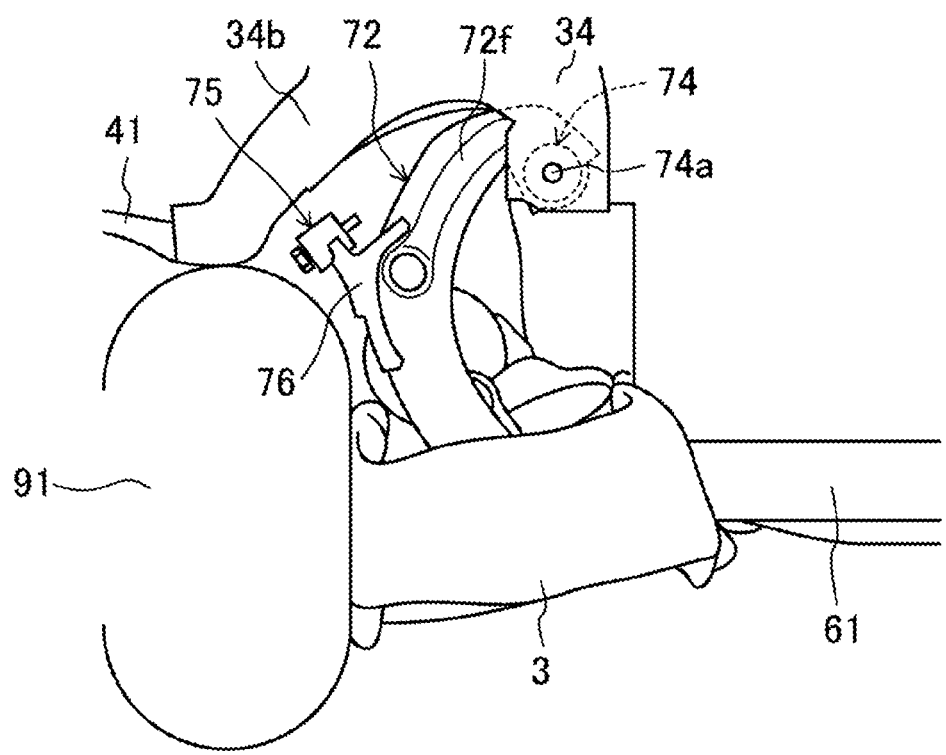
FIG. 7 is a bottom view schematically showing the right-side suspension arm in its deformation state when the obstacle further retreats relative to the vehicle from the state shown in FIG. 6.

Herein, as shown in FIG. 7, the second vehicle-body attachment portion 75 of the right-side suspension arm 72 is detached from the right-side forward extension portion 34b and also the right-side suspension arm 72 is bent at the fragile portion 77, so that the right-side front wheel 3 is rotated rearwardly around the fragile portion 77. Herein, since the fragile portion 77 is provided near the first vehicle-body attachment portion 74 of the right-side suspension arm 72, a rotational radius of the front wheel 3 can be substantially the same degree as the one in a case where the right-side suspension arm 72 (the right-side front wheel 3) is made to be rotated around the first wheel-body attachment portion 74. Consequently, the right-side front wheel 3 can be displaced outwardly in the vehicle width direction as much as possible relative to the cabin, so that the collision load which is applied to the cabin by way of the front wheel 3 can be reduced as much as possible. In the present embodiment, the right-side front wheel 3 hits against a right-side side sill 61 (see FIG. 1) or a hinge pillar (not shown in FIG. 7) which is connected to a front end of the side sill 61 and extends upwardly, but does not hit against a vehicle-body portion which is positioned on the inward side (a cabin side), in the vehicle width direction, of the right-side side sill 61 or the hinge pillar Meanwhile, differently from the case where the suspension arm 72 is made to be rotated around the first vehicle-body attachment portion 74, it is unnecessary in designing the first vehicle-body attachment portion 74 to consider the rotation of the suspension arm 72 in the small overlap collision. Accordingly, the support performance of the suspension arm 72 (the shock-absorption performance of the suspension device 71 for the vehicle) in the normal traveling state of the vehicle 1 is not deteriorated.

In a case where the vehicle 1 has the small overlap collision at the left-side part of its front face and thereby the load greater than the specified magnitude (collision load) is inputted to the left-side front wheel 3 from the vehicle forward side as well, the left-side suspension arm 72 is bent at the fragile portion 77 and the left-side front wheel 3 is rotated rearwardly around the fragile portion 77, similarly to the right-side suspension arm 72.

Accordingly, in the present embodiment, the collision load applied to the cabin by way of the front wheel 3 can be reduced as much as possible in the small overlap collision, without deteriorating the support performance of the suspension arm 72 in the normal traveling state of the vehicle 1.

The present invention should not be limited to the above-described embodiment and any other modifications or improvements may be applied within the scope of a spirit of the present invention.

For example, while the suspension arm 72 comprises the curve portion 72a which is configured such that the suspension arm 72 curves rearwardly from the front-wheel support portion 73 toward the first vehicle-body attachment portion 74 in the above-described embodiment, the present invention is applicable to the suspension arm 72 which is configured such that it extends in the vehicle width direction roughly straightly without providing the curve portion 72a.

Further, the curve portion 72a may be configured such that its curvature (or its curvature radius) is constant over a whole part of the curve portion 72a. In this case, the maximum curvature portion 72b corresponds to the whole part of the curve portion 72a. Further, in this case, it is preferable that the fragile portion 77 be provided at a portion which is positioned on the side of the first vehicle-body attachment portion 74 of the curve portion 72a. However, in a case where the end of the curve portion 72a which is positioned on the side of the first vehicle-body attachment portion 74 is located near the first vehicle-body attachment portion 74, the fragile portion 77 may be positioned at the curve portion 72a.

Moreover, while the fragile portion 77 is constituted by the recess portion 72g which is formed at the upper face of the side wall portion 72d in the above-described embodiment, it may be constituted by a recess-shaped bead extending in the vertical direction which is formed at a face of the side wall portion 72d which is opposite to another face of the side wall portion 72d which faces the side all portion 72e.

What is claimed is:

1. A vehicle comprising:
    a cabin;
    a front wheel supported at a side portion of the vehicle which is positioned in front of the cabin;
    a suspension arm provided with a front-wheel support portion supporting the front wheel of the vehicle at one end thereof and a vehicle-body attachment portion attached to a vehicle-body member of the vehicle at the other end thereof, the vehicle-body attachment portion being positioned on an inward side, in a vehicle width direction, of the front-wheel support portion; and
    a fragile portion provided at a portion of the suspension arm which is positioned near the vehicle-body attachment portion,
    wherein said fragile portion is configured such that when a load which is greater than a specified magnitude is inputted to said front wheel from a vehicle forward side, said suspension arm is bent at said fragile portion, whereby the front wheel is rotated rearwardly around the fragile portion of the suspension arm,
    wherein said suspension arm comprises a bottom wall portion extending in the longitudinal direction of the suspension arm and a pair of side wall portions extending upwardly from both ends, in a width direction, of said bottom wall portion such that the suspension arm has a roughly U-shaped cross section, and a recess portion which is recessed downwardly is formed at an upper face of one of said side wall portions which is located on a bending inward side of said suspension arm in a state where the suspension arm is bent at the fragile portion.

2. The vehicle of claim 1, wherein a curve portion is provided at a middle portion, in a longitudinal direction, of said suspension arm, the curve portion being configured such that the suspension arm curves rearwardly from said front-wheel support portion toward said vehicle-body attachment portion, and said fragile portion is positioned on a side of the vehicle-body attachment portion relative to a maximum curvature portion of the curve portion where curvature of the curve portion is the maximum.

3. The vehicle of claim 2, wherein a reinforcing member is provided at a portion of said suspension arm which includes at least said maximum curvature portion, excluding said fragile portion, such that the reinforcing member extends in the longitudinal direction of the suspension arm.

4. A suspension arm which is provided with a front-wheel support portion supporting a front wheel of a vehicle at one end thereof and a vehicle-body attachment portion attached to a vehicle-body member of the vehicle at the other end thereof, the vehicle-body attachment portion being positioned on an inward side, in a vehicle width direction, of the front-wheel support portion,
    wherein a fragile portion is provided at a portion of the suspension arm which is positioned near said vehicle-body attachment portion, and
    said fragile portion is configured such that when a load which is greater than a specified magnitude is inputted to the front wheel from a vehicle forward side in a state where the suspension arm is attached to the vehicle-body member of the vehicle, the suspension arm is bent at the fragile portion, whereby the front wheel is rotated rearwardly around the fragile portion of the suspension arm,
    wherein the suspension arm comprises a bottom wall portion extending in the longitudinal direction of the suspension arm and a pair of side wall portions extending upwardly from both ends, in a width direction, of said bottom wall portion such that the suspension arm has a roughly U-shaped cross section, and a recess portion which is recessed downwardly is formed at an upper face of one of said side wall portions which is located on a bending inward side of said suspension arm in a state where the suspension arm is bent at the fragile portion.

5. The suspension arm of claim 4, wherein a curve portion is provided at a middle portion, in a longitudinal direction, of the suspension arm, the curve portion being configured such that the suspension arm curves rearwardly from said front-wheel support portion toward said vehicle-body attachment portion, and said fragile portion is positioned on a side of the vehicle-body attachment portion relative to a maximum curvature portion of the curve portion where curvature of the curve portion is the maximum.

6. The suspension arm of claim 5, wherein a reinforcing member is provided at a portion of the suspension arm which includes at least said maximum curvature portion, excluding said fragile portion, such that the reinforcing member extends in the longitudinal direction of the suspension arm.

* * * * *